United States Patent [19]

Job

[11] Patent Number: 4,806,696

[45] Date of Patent: Feb. 21, 1989

[54] PROCESS FOR STABLE PREPARATION OF ALKOXYMAGNESIUM COMPOUNDS

[75] Inventor: Robert C. Job, Houston, Tex.

[73] Assignee: Shell Oil Company, Houston, Tex.

[21] Appl. No.: 124,642

[22] Filed: Nov. 24, 1987

Related U.S. Application Data

[63] Continuation-in-part of Ser. No. 875,845, Jun. 18, 1986, Pat. No. 4,710,482.

[51] Int. Cl.$^4$ .............................................. C07C 31/30
[52] U.S. Cl. ................................... 568/851; 502/162; 502/171
[58] Field of Search ............... 502/118, 119, 121, 123, 502/124, 125, 126, 127, 128, 133, 134, 171, 162; 568/851

[56] References Cited

U.S. PATENT DOCUMENTS

| | | | |
|---|---|---|---|
| 4,328,328 | 5/1982 | Minami et al. | 502/125 X |
| 4,329,253 | 5/1982 | Goodall et al. | 502/125 X |
| 4,393,182 | 7/1983 | Goodall et al. | 526/125 |
| 4,400,302 | 8/1983 | Goodall et al. | 502/125 X |
| 4,414,132 | 11/1983 | Goodall et al. | 502/125 X |
| 4,465,783 | 8/1984 | McKenzie | 502/134 X |
| 4,478,952 | 10/1984 | Mack et al. | 502/110 |
| 4,540,679 | 9/1985 | Arzoumanidis et al. | 502/127 X |

FOREIGN PATENT DOCUMENTS 2101610 1/1983 United Kingdom .

OTHER PUBLICATIONS

"Alkoxymagnesium Halides", by N. Ya. Turova and E. P. Turevskaya, J. of *Organometal. Chemistry*, 42, (1972) pp. 8–17.

*Primary Examiner*—Patrick P. Garvin
*Attorney, Agent, or Firm*—Donald F. Haas

[57] ABSTRACT

A process is disclosed for preparing a stable crystalline alkoxymagnesium compound which comprises treating the compound with a buffer compound. The buffer compound is preferably tetraethoxysilane.

18 Claims, 2 Drawing Sheets

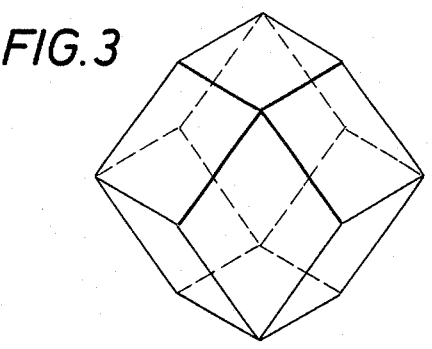
FIG.3 CHLORIDE
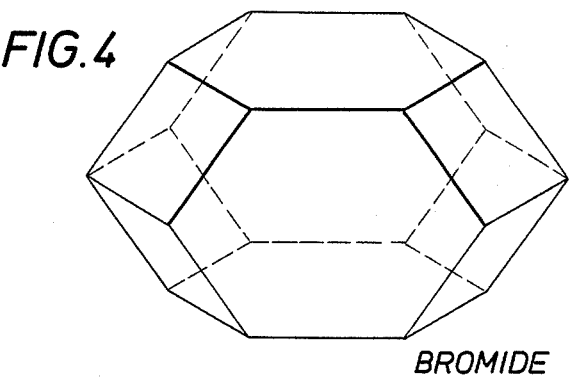
FIG.4 BROMIDE
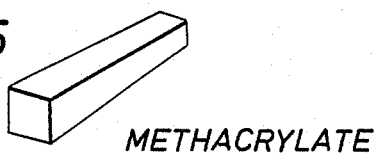
FIG.5 METHACRYLATE
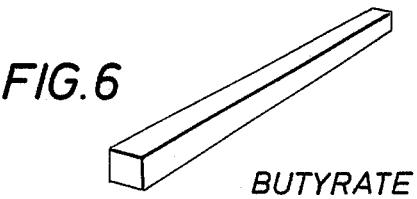
FIG.6 BUTYRATE
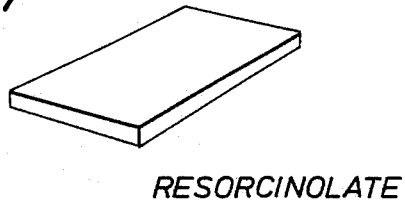
FIG.7 RESORCINOLATE
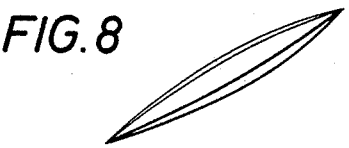
FIG.8 ACRYLATE ACETATE
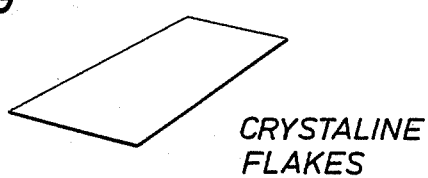
FIG.9 CRYSTALINE FLAKES
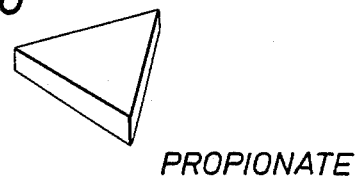
FIG.10 PROPIONATE
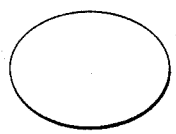
FIG.11 BENZOATE
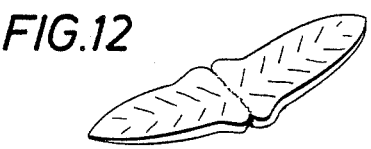
FIG.12 CHLOROACETATE

4,806,696

PROCESS FOR STABLE PREPARATION OF ALKOXYMAGNESIUM COMPOUNDS

This application is a continuation-in-part of my application entitled "Olefin Polymerization Catalyst Component", Ser. No. 875,845, filed June 18, 1986, and now Patent No. 4,710,482.

FIELD OF THE INVENTION

This invention relates to a process for preparing, in a stable fashion, alkoxymagnesium compounds, which can be used to make polymerization catalysts having improved productivity and/or morphological properties. The preferred compounds are of the general formula $[Mg_4(OR)_6(R'OH)_{10}]X$. The components are prepared either via solutions of magnesium alkoxide or from crystalline magnesium alkoxide of the formula $Mg(OCH_3) \cdot 4CH_3OH$ each of which has been stabilized towards decomposition to intractible magnesium alkoxide polymer.

BACKGROUND OF THE INVENTION

There are a number of means to prepare such starting magnesium compounds. One way is disclosed in the article "Alkoxymagnesium Halides" by Turova et al, *Journal of Organometallic Chemistry*, 42, pages 9–17 (1972), which disclosure is herein incorporated by reference. The phase diagram shown in the attached FIG. 2 is taken from FIG. 1 of the Turova article. As mentioned above it is much preferred that the "R" and "R'" in the crystal structure be a methyl group. Accordingly, the remainder of the disclosure will reference methanol, methyl or methoxy groups.

One method to prepare the crystal structures of the present invention (as disclosed in Turova et al) involves preparing solutions of $MgCl_2$ in methanol and $Mg(OCH_3)_2$ in methanol, then mixing the controlled solutions in a mole ratio of $MgCl_2$ to $Mg(OCH_3)_2$ of 1:3 and then removing the methanol solvent until the crystals are formed. If desired, small amounts of vaseline oil may be added to improve crystallization.

Another equivalent method disclosed herein involves the use of Mg metal, $MgCl_2$ and methanol. In this method three equivalents of the Mg is dissolved in a methanolic solution of $MgCl_2$ to again provide the 3:1 mole ratio of methoxide to chloride.

The extremely narrow stability range required by the ternary phase relationship would tend to make either of the above methods difficult for commercial implementation. As discussed in the above-mentioned article by Turova, it requires great care to control solution concentrations and conditions to prepare stable crystal structures. Such care may be possible under laboratory conditions, but such level of care may be very difficult under commercial plant conditions. Accordingly, applicant has also discovered a method for preparing such structures by using a "buffer" technique. In this technique advantage is taken of the nearly equivalent ability of the Si-OCH3 and Si-Cl bonds to use $SiCl_4$ to remove excess methoxide and virtually buffer the methanolic solution over a wide range of effective methoxide concentrations.

SUMMARY OF THE INVENTION

The present invention relates to a process for stable preparation of a stable crystalline alkoxymagnesium compound which may be, for example, of the formula $Mg(OR)_2 \cdot nR'OH$ or $[Mg_4(OR)_6(R'OH)_{10}]X$, where X is a counter ion or ions having a total charge of $+2$ and R and R', which may be the same or different, are selected from alkyl groups of 1 to 4 carbon atoms. The process comprises contacting $Mg(OR)_2$, MgX (where appropriate) and R'OH in solution in the presence of a buffer compound. The buffer compound stabilizes the alkoxymagnesium compound against decomposition to undesirable polymeric materials. The buffer compound is preferably $Si(OR'')_4$, which may be formed in situ from silicon tetrachloride, R and R' and R'' are preferably methyl and X is preferably $2Cl^-$ or $2Br^-$. The solvent may be an alcohol or a mixture of alcohols or a mixture of an alcohol and an inert organic solvent, such as isooctane, toluene, kerosene or cyclohexane. If the magnesium compound is $Mg(OR)_2$, it must be maintained in the presence of the buffer compound in order for it to remain stable.

BRIEF DESCRIPTION OF THE DRAWINGS

An important aspect relates to the method by which the stable magnesium crystal is prepared.

Another important aspect relates to the method by which the stable magnesium crystal is prepared. FIG. 2 shows a ternary phase diagram for the system magnesium methoxide, magnesium chloride, methanol. Until this invention the narrow triangle ABC was the only region of component concentrations which could be employed to achieve the stable crystal $Mg_4(OMe)_6Cl_2 \cdot 10MeOH$.

FIG. 3 shows the precursor, procatalyst and polymer particle shape when X=Cl.

FIG. 4 shows the precursor, procatalyst and polymer particle shape when X=Br.

FIG. 5 shows the precursor, procatalyst and polymer particle shape when X=methacrylate or a methacrylate/resorcinolate mixture.

FIG. 6 shows the precursor, procatalyst and polymer particle shape wen X=butyrate.

FIG. 7 shows the precursor, procatalyst and polymer particle shape obtained with the Mg compound of FIG. 1 when X is resorcinolate or an acetate/resorcinolate mixture.

FIG. 8 shows the precursor, procatalyst and polymer shape produced with the Mg compound of FIG. 1 when X is acrylate or acetate.

FIG. 9 shows the precursor, procatalyst and polymer shape produced with the Mg compound of FIG. 1 when X is 2,4-pentanedionate.

FIG. 10 shows the precursor, procatalyst and polymer shape produced with the Mg compound of FIG. 1 when X is propionate.

FIG. 11 shows the precursor, procatalyst and polymer shape produced with the Mg compound of FIG. 1 when X is benzoate.

FIG. 12 shows the precursor, procatalyst and polymer shape produced with the Mg compound of FIG. 1 when X is chloroacetate.

DETAILED DESCRIPTION OF THE INVENTION

As state above, the key aspect of the present invention involves the use of a buffer material to produce conditions under which a stable crystalline compound of this formula can be produced. In this technique advantage is take of the ability of the $Si(OR)_4$ to virtually buffer the methanolic solution over a wide range of effective methoxide concentrations to prevent the irreversible polymerization represented by $k_1$ in the following scheme where the pertinent tetramer/monomer equilibrium is represented by the equilibrium constant K and where in normally, non-buffered solutions $k_1$ and $k_2$ (reaction rates) become rapid either at temperatures above 30° C. or at concentrations above about 8% $Mg(OCH_3)_2$ (by weight in $CH_3OH$). In any reasonable commercial process concentrations of 12 to 25% and temperatures above 30° C. would be expected to be used and thus this stabilization technique becomes essential. It allows one to obtain up to a 28% concentration at the boiling point of $CH_3OH$ (67° C.).

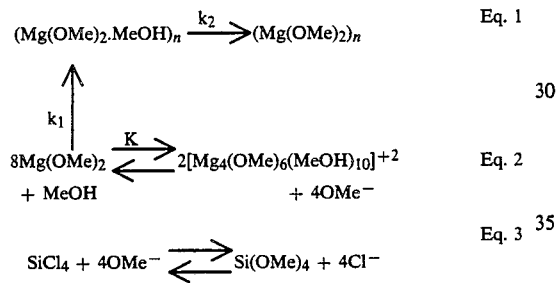

Figure 1:
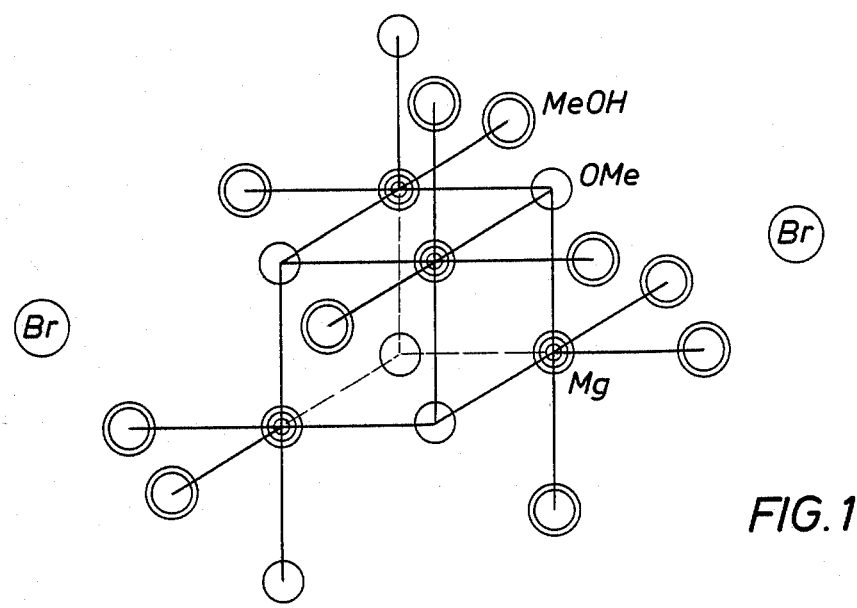
FIG. 1 shows the molecular structure of the dication, where the blackened circles are Mg, the small open circles are methoxy ($OCH_3$) and the large open circles are methanol ($CH_3OH$). Note that two bromide ions ions serve only to balance the positive charge but are not essential to the molecular structure.
Figure 2:
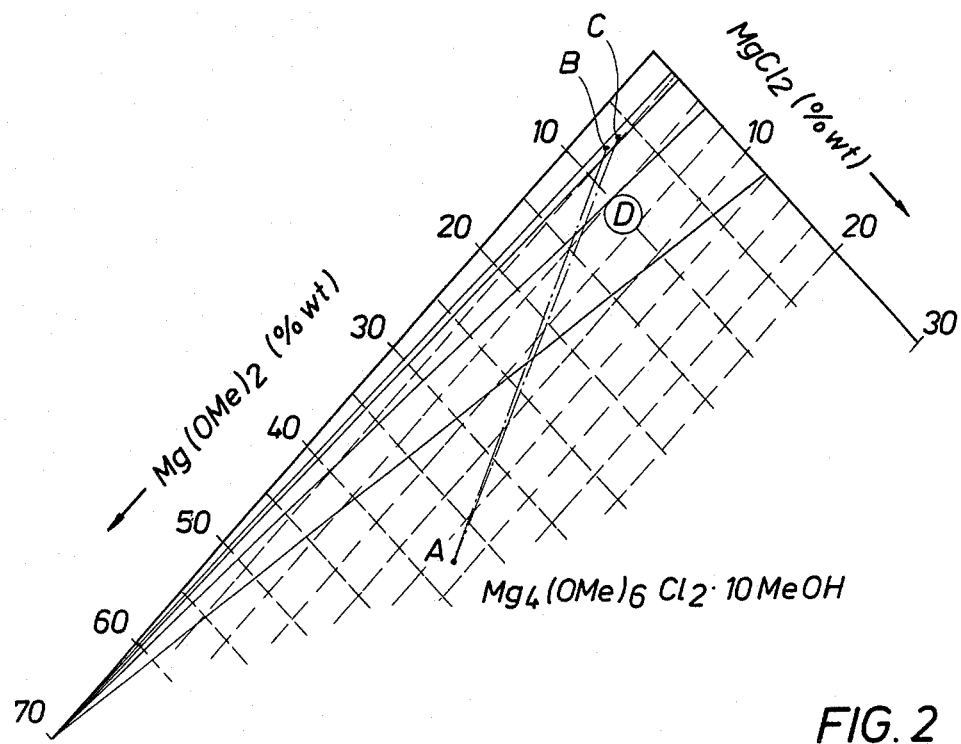
FIG. 2 shows a ternary phase diagram for the system magnesium methoxide, magnesium chloride, methanol. Until this invention the narrow triangle ABC was the only region which can be employed to achieve the stable crystal $Mg_4(OMe)_6Cl_2 \cdot 10MeOH$. More about the method to prepare the crystal will be explained in the Detailed Description of the Invention.

In the above scheme, magnesium methoxide and methanol are in equilibrium in solution with the crystalline magnesium compound. If conditions are not right, then as shown in Equation 2, $(Mg(OCH_3)_2 \cdot MeOH)_n$ precipitate occurs. If concentrations are extremely high, this precipitate polymerizes to $[Mg(OCH_3)_2]_n$, polymer. However if $Si(OR)_4$ is added to the system, then it is possible to operate effectively in a wide range of concentrations outside of the narrow wedge (ABC) described in Turova. This is shown in FIG. 2 where $Si(OR)_4$ has been generated in situ as illustrated in Equation 3 by circle D which represents the effective methoxy/chloro concentrations of examples 5 and 6 below. This buffering approach effectively opens the wedge by moving the line AC to the right.

Materials other than just $SiCl_4$ can be used to buffer the solution. Anything that can abstract methoxy and does not provide an anion so large as to seriously distort the crystal shape may be used. These compound include silicon tetrachloride, silicon tetrabromide, tetramethoxy silane, tetraethoxy silane and phenyltrimethoxy silane as well as oxalic acid, acetic acid and formic acid, where if $Si(OR)_4$ is not generated in situ it must be added to the solution. Phosphorous compounds such as $P(OCH_3)_3$, $PCl_3$ and $PBr_3$ may also be used so that $P(OR)_3$ is present.

Another method for producing stable alkoxy magnesium compounds within the scope of the present invention involves treating the buffer compound, such a silicon tetrahalide, with an alkoxy magnesium compound such as dimethoxy magnesium. This would then be followed by the addition of methanol, for example, thereby generating the stabilizing $Si(OR)_4$ species in situ. The alkoxy magnesium compound of the present invention can then be produced simply adding to this solution a solution of dimethoxy magnesium. The stabilized alkoxy magnesium compounds above may be subjected to a further stabilizing treatment. One method involves treating the above produced compounds with hydrogen chloride gas. Catalysts treated in this manner will produce a polymer with extremely high bulk density, very low polymer fines and good shape replication but with an extremely rough polymer surface. The alkoxy magnesium compounds above may also be boiled in an inert hydrocarbon, e.g. isooctane or cyclohexane. Any liquid hydrocarbon that forms azeotropes with methanol may be used. This stabilizing method produces a polymer with high bulk density, perfect shape replication and a smooth surface, but the productivity is lower than with the HCl treatment. If there is no treatment, then the polymer has a high bulk density but the shape retention is not as good. It is theorized that these methods remove excess methanol groups from the alkoxy magnesium compound and that a consequence of this removal is an increase in the stability of the crystal structure. The boiling procedure has a tendency to decrease the activity of the catalyst. Another advantage of this approach is to decrease the Ti level in the final procatalyst by decreasing the amount of sparingly soluble (Cl)(OMe)Ti species which may be formed upon contact with $TiCl_4$. This can be at least partially prevented by first adding an amount of $Si(OR)_4$ and then proceeding with the boiling operation.

In addition to $Mg(OCH_3)_2$, other starting components include halogen containing magnesium compounds and magnesium dialkoxides. Examples of halogen containing magnesium compounds that can be used as starting materials for the reaction are alkoxy magnesium halides, such as isobutoxy magnesium chloride, ethoxy magnesium chloride, and ethoxy magnesium bromide.

These crystalline materials are useful in the production of titanium-containing catalyst components for use in the polymerization of olefins. Once these uniformly optimized particles of this crystalline magnesium compound have been obtained, it is then necessary to convert them to magnesium halide in a metathesis reaction (digestion), such as that disclosed in U.S. Pat. No. 4,414,132. The magnesium halides produced in the metathesis reaction may then be used in the production of supported catalysts for the polymerization of olefins. In many cases, the catalyst formed with these crystalline magnesium compounds exhibit high activity and produce polymer with excellent morphological properties. The manufacture of the catalyst and the polymerization of the olefins may be carried out using techniques well known in the art such as those discussed in the aforementioned U.S. Pat. No. 4,414,132.

The polymerizations may be carried out by any of the conventional techniques, such as gas phase polymerization or slurry polymerization using liquid monomer or an inert hydrocarbon diluent as the liquid medium. Hydrogen may be used to control the molecular weight of the polymer without detriment to the stereospecific performance of the catalyst compositions. Polymerization may be affected batchwise or continuously with constant or intermittent supply of the catalyst composition or one or more of the catalyst components to the polymerization reactor.

The following examples illustrate the invention:

ILLUSTRATIVE EMBODIMENT I

Preparation of the magnesium containing precursors

A. Preparations using exact stoichiometry (i.e. $OCH_3°C.1=3.0$).

1. (Staying within the metastable wedge.) Anhydrous magnesium chloride was dissolved in methanol and about 1/6 of the solvent distilled away. 3.0 equivalent of magnesium metal was added slowly, to maintain a gentle reflux, then the reaction kept under reflux to finish the magnesium consumption. After standing, a mixture of pumpkin shaped crystals and some grey powder was obtained. The product was slurried in a mixture of methanol/isopropanol and the grey powder decanted. After washing again with the methanol/isopropanol solution, the crystals were dried under moving nitrogen to give a recovery of 65% basis total magnesium. (analysis: Mg=15.5%, Cl=12.2%, Mg/Cl=1.85 mol/mol). The mother liquor had the approximate composition of 8.5% $Mg(OCH_3)_2$ + 3.0% $MgCl_2$, a stable solution according to the ternary phase diagram.

2. (Leaving the metastable wedge by dilution.) The preparation was carried out as in example 1 except that, at the end of the reflux, an equal volume of isooctane was added to the hot methanol solution together with enough isopropanol to yield a homogeneous solution. Upon cooling, the yield of crystalline product was essentially quantitative, based on total magnesium. (Analysis: Mg=14.1%, Cl=10.4%, Mg/Cl=2.0 mol/mol). In contrast to example 1, the product appeared to be a mixture of crystalline forms.

B. Preparations using excess chloride (i.e. $OCH_3/Cl<3$).

3. (Moving outside the metastable wedge via high Cl concentration.) Commercially available magnesium chloride was dissolved in 8% commercially available methanolic magnesium methoxide (70 g $MgCl_2$ per quart of solution). After standing overnight the floculant magnesium was filtered away from the solution. 1.5 liter of the clear solution was mixed with 1.5 l of isooctane and 0.8 l of isopropanol was added to insure homogeneity. The solution was stirred at 230 rpm with a teflon paddle stirrer. After a day, the precipitate was collected, washed with isooctane and dried under moving nitrogen. The yield, based on total magnesium, was 42%. (Analysis: Mg=15.9%, Cl=22.8%, Mg/Cl=1.0 mol/mol). The product appeared to be mixture of at least two compounds consisting of well formed crystals in the 5-30 micron range.

4. Anhydrous magnesium chloride was dissolved in methanol then 1.0 equivalent of magnesium turnings was added at a rate so as to maintain a gentle reflux. After magnesium addition was finished, heat was applied and reflux was continued overnight. Then an equal volume of isooctane was added, to the hot solution, together with sufficient isopropanol to homogenize. The solution was allowed to cool, with vigorous stirring, to give spheroidal amorphous product in the size range of 20-80 microns. The yield, based on total magnesium, was 81.5%.

C. Preparation with excess chlordie in the presence of $SiCl_x(OCH_3)_y$ buffer.

5. Magnesium (43 g, 1.77 mol) was added, in 5-8 g portions, to 1200 ml of methanol in a 2 l erlenmeyer flask. The solvent was heated gently to initiate the magnesium dissolution. After that, the heat of reaction was sufficient to maintain a gentle reflux. After all of the magnesium had dissolved, silicon tetrachloride (45 g, 264 mmol; 20% excess basis total Cl) was added slowly (since this present a rather exothermic acid/base reaction). Two of these preparations were combined and sufficient methanol distilled away to bring the total volume to 1.6 to 1.7 l. The hot solution, 'A', was then poured into a 2 l reaction kettle, equipped with a large bladed paddle stirrer and stainless steel baffles, and stirred at high speed until the solution had cooled and a large mass of small crystals was obtained. The crystals were collected upon a course fritted funnel, washed twice with a mixture of 500 g isooctane/150 g isopropanol, washed twice with isooctane and dried under moving nitrogen for about 20 minutes. The yield was 420 g (71%). Visible and scanning electron microscopic examination reveal the product to be of a homogeneous crystal type in the shape of rhombic dodecahedrons.

6. 105 g of the hot solution 'A', from example 5, was mixed with 61 g of toluene to give a clear solution. Upon stirring overnight 8.1 g of well formed, transparent crystals, in the shape of rhombic dodecahedrons, were obtained.

In the above examples, the crystals made in Example 1 demonstrate the preparation according to the invention, and make good catalysts. Example 2 is outside the wedge ABC and does not make good catalysts. Likewise examples 3 and 4 are also outside the invention. Examples 5 and 6 show buffered systems according to the present invention.

Preparation of the Procatalysts

The procatalysts (examples 7-17) were prepared as follows: Electron donor (type and amount shown in Table 1) were added along with 150 ml of a 1:1 (vol:vol) mixture of titanium tetrachloride and chlorobenzene to 50 mmol of the appropriate magnesium precursor (Table 1) and stirred at room temperature for 15 minutes. The mixture was then stirred for an hour at 100°, 110° and 120° C. (as shown in table) and filtered hot. The residual solid was slurried in 150 ml of the 1:1 titanium tetrachloride/chlorobenzene solution, 0.2 to 0.4 ml of phthaloyl chloride was added (U.S. Pat. No. 4,535,068), and the slurry stirred for 30-60 minutes at 110° C. After a hot filtration, the solid was slurried in 150 ml of the 1:1 titanium tetrachloride/chlorobenzene solution and stirred at 110° C. for 30 minutes and filtered hot. The reaction vessel was cooled to below 40° C. and the solid was washed 6 times with 150 ml portions of isopentane then dried for 100 minutes, at 40° C., under moving nitrogen. The titanium content of the various procatalysts is shown in Table 1.

TABLE 1

| Example # | Mg Precursor | Electron Donor | Titanium (% wt) | Comments |
|---|---|---|---|---|
| 7 | 1 | iBP (9.7 mmol) | 3.44 | |
| 8 | 1 | iBP (6.0) | 4.63 | |
| 9 | 1 | iBP (7.5) | 4.06 | |
| 10 | 1 | MpT (16.7) | 5.30 | |
| 11 | 2 | iBP (7.6) | 4.10 | |
| 12 | 3 | iBP (17.3) | 4.98 | |
| 13 | 4 | iBP (11.1) | 4.81 | |
| 14 | 5 | iBP (9.9) | 4.67 | |
| 15 | 5 | iBP (8.7) | 2.00 | The magnesium precursor was boiled in isooctane for 1 hr to remove |

TABLE 1-continued

| Example # | Mg Precursor | Electron Donor | Titanium (% wt) | Comments |
|---|---|---|---|---|
| | | | | 92% of the bound methanol. |
| 16 | 5 | iBP (8.7) | 4.49 | |
| 17 | 6 | iBP (8.7) | 4.04 | | iBP = isobutylphthalate
MpT = methyl-p-toluate

Liquid Pool (LIPP) and Gas Phase Propylene Polymerizations

Lipp polymerizations were carried out for two hours at 67° C., in a 1 gal autoclave, using 2.7 l of propylene, 132 mmol of hydrogen, and sufficient catalyst to provide 8 micromoles of titanium. Triethylaluminum (70 mol/mol Ti) was mixed with 17.5 mmol of SCA (ethyl-p-ethoxybenzoate for example #23, diphenyldimethoxysilane for all others) and either premixed with the procatalyst 5 to 30 minutes before injection or injected directly to the autoclave before procatalyst injection.

Gas phase polymerizations were carried out, for two hours at 67° C., at a pressure of 300 psig, with a 10 g/min propylene flow, in a 4 gal autoclave equipped with a ribbon stirrer. After gas flow had been established in the autoclave, the SCA was injected (17.5 mol/mol Ti) followed by the triethyl aluminum (70 mol/mol Ti) followed by the procatalyst (sufficient to provide 8 micromoles of titanium).

The results are shown in Table 2. Note that examples 23-26 are really counterexamples using catalysts prepared from magnesium chloro methoxides which are not pure $Mg_4(OMe)_6(MeOH)_{10}Cl_2$ and that is why their productivities are so much poorer than the others. Catalyst nos. 7-17 are those made in Examples 7-17, respectively.

TABLE 2

| Example # | Catalyst # | Productivity (Kg PP/g cat) | X.S. (% wt) | Phase | Morphology Details |
|---|---|---|---|---|---|
| 18 | 7 | 44.7 | 6.8 | l | |
| 19 | 7 | 24.0 | 4.5 | g | 0.37 b.d., 84.5% of polymer at 0.25-2.0 mm |
| 20 | 8 | 40.6 | 9.1 | l | 0.32 b.d., 85.6% of polymer at 0.50-2.0 mm |
| 21 | 8 | 20.4 | 13.8 | g | 0.35 b.d., 88.6% of polymer at 0.50-2.0 mm |
| 22 | 9 | 40.9 | 6.1 | l | 0.39 b.d., 87.1% of polymer at 0.25-2.0 mm |
| 23 | 10 | 18.8 (1 hr) | 7.9 | l | |
| 24 | 11 | 24.9 | 6.5 | l | |
| 25 | 12 | 6.0 | 8.5 | l | |
| 26 | 13 | 10.5 | 9.7 | l | |
| 27 | 14 | 66.1 | 7.2 | l | 0.43 b.d. |
| 28 | 14 | 15.8 | 5.4 | g | |
| 29 | 15 | 34.3 | 3.4 | l | 0.37 b.d., 84.3% of polymer at 0.25-2.0 mm |
| 30 | 15 | 10.2 | 2.0 | g | |
| 31 | 16 | 46.1 | 6.2 | l | 0.39 b.d., 80.7% of polymer at 0.5-2.0 mm |
| 32 | 17 | 63.9 | 7.5 | l | 0.36 b.d. |
| 33 | 17 | 20.9 | 5.4 | g | |

"g" is gas phase polymerization;
X.S. is xylene solubles
"l" is liquid phase polymerization
"b.d." is bulk density

Illustrative Embodiment II

In this Illustrative Embodiment, the preparation of the magnesium containing precursors was carried out according to preparation C in Illustrative Embodiment I with the exception that bromide replaced chloride in all cases. The resulting crystals were in the shape of dodecahedrons, such as seen in FIG. 4. Some of the magnesium precursors were post treated with HCl gas in isooctane or by boiling them in an inert hydrocarbon to remove some of the methanol groups and improve the stability. The catalyst preparation was carried out as set forth in Illustrative Embodiment I with the details and modifications shown in Table 3.

TABLE 3

| Example No. | Electron Donor | Titanium, % wt. | Comments |
|---|---|---|---|
| 34 | iBp (2.5 ml) | 3.91 | 0.3 ml PC, 110° C. digest |
| 35 | iBp (3.0 ml) | 3.12 | 0.3 ml PC, 120° C. digest |
| 36 | iBp (2.5 ml) | 3.08 | 0.3 ml PC, 120° C. digest |
| 37 | iBp (2.5 ml) | 2.93 | 0.4 ml PC, 110° C. digest, 120° C. wash |
| 38 | iBp (3.0 ml) | 3.91 | no PC; 120° C. digest |
| 39 | iBp (1.73 ml + 0.3 mlEB) | 4.41 | 120° C. digest. Post treatment with HCl in isooctane |
| 40 | iBp (1.73 ml + 0.3 mlEB) | 5.06 | 110° C. digest. Post treatment with HCl in isooctane |
| 41 | iBp (1.73 ml + 0.3 mlEB) | 4.75 | 100° C. digest. Post treatment with HCl in isooctane |
| 42 | iBp (3.0 ml) | 3.23 | 0.3 ml PC, 110° C. digest, boiling isooctane post treatment |
| 43 | iBp (2.5 ml) | 3.37 | 0.3 ml PC, 110° C. digest, boiling isooctane post treament |
| 44 | iBp | 1.00 | boiled in decalin |
| 45 | iBp (1.73 ml + 0.3 mlEB) | — | — |
| 46 | iBp (1.73 ml + 0.3 mlEB) | | Standard magnesium chloride supported catalyst via Mg(OEt)$_2$ | iBp = diisobutylphthalate
PC = phthaloyl chloride
EB = ethyl benzoate

The catalyst from Table 3 were utilized in the polymerization of propylene both in liquid phase and gas phase operations. The polymerizations were carried out according to the procedures set forth in Illustrative Embodiment I and the results of the polymerizations are set forth below in Table 4.

TABLE 4

| Example # | Catalyst Example # | Productivity (Kg PP/g cat) | X.S. (% wt) | Phase (g/l) | Morphology Details |
|---|---|---|---|---|---|
| 47 | 34 | 61.4 | 4.8 | l | b.d. = 0.33 |
| 48 | 34 | 19.5 | 4.0 | g | b.d. = 0.35 |

TABLE 4-continued

| Example # | Catalyst Example # | Productivity (Kg PP/g cat) | X.S. (% wt) | Phase (g/l) | Morphology Details |
|---|---|---|---|---|---|
| 49 | 35 | 50.7 | 4.1 | l | b.d. = 0.444 |
| 50 | 35 | 19.0*, 35 | 1.9*, 4.5 | g | b.d. = 0.36*, 0.39 |
| 51 | 36 | 48.8 | 3.6 | l | b.d. = 0.405 |
| 52 | 36 | 20.8*, 37.9 | 2.3*, 3.0 | g | b.d. = 0.35*, 0.38 |
| 53 | 37 | 48.8 | 4.1 | l | b.d. = 0.39 |
| 54 | 37 | 28.8 | 4.4 | g | b.d. = 0.394 |
| 55 | 38 | 58.2 | 6.1 | l | b.d. = 0.41 |
| 56 | 38 | 33.5 | 5.2 | g | b.d. = 0.405, 2.7% fines below 120 microns |

*Two hour polymerizations at 67° C.

| Example # | Catalyst Example # | Productivity | X.S. | Phase | Morphology Details |
|---|---|---|---|---|---|
| 57 | 39 | 32.0 | 5.7 | l | b.d. = 0.419 |
| 58 | 40 | 41.6 | 6.6 | l | b.d. = 0.448, 0.4% fines below 120 microns |
| 59 | 41 | 37.0 | 7.4 | l | b.d. = 0.412 |

The above three polymerizations were all in liquid phase at 67° C.

| | | | | | |
|---|---|---|---|---|---|
| 60 | 42 | 18.6 | 3.7 | l | b.d. = 0.378 |
| 61 | 42 | 16.9 | 4.1 | l | b.d. = 0.372 |
| 62 | 42 | 11.9 | 7.4 | l | b.d. = 0.412 |
| 63 | 43 | 8.7 | 4.9 | l | |
| 64 | 44 | 0.1 | | l | |
| 65 | 45 | 35.2 | | g | b.d. = 0.378, 0.7% fines below 120 microns |
| 66 | 46 | 18.01 | 2.4 | g | b.d. about 0.3, 7.5% fines below 120 microns |

"g" is gas phase polymerization
"l" is liquid phase polymerization
"b.d." is bulk density It can be seen by reviewing the results of Example 66 that a standard magnesium chloride catalyst produces polymer with a relatively high amount of fines below 120 microns, i.e. 7.5%. Examples 56 and 65, which utilize catalysts which were not post treated but which were prepared according to the present invention, give polymer with much lower fines, i.e. 2.7% and 0.7% below 120 microns. Example 58 wherein the catalyst was prepared according to the present invention and was post treated with hydrogen chloride gave polymer with the lowest percentage of fines of all, i.e. 0.4% below 120 microns. The bulk density of the polymer produced in the above three examples wherein the catalyst was prepared according to the present invention was higher than the bulk density of the polymer prepared from the standard magnesium supported catalyst.

ILLUSTRATIVE EMBODIMENT III

Example 65

Preparation of Unstabilized Mg(OMe)$_2$ Solution

Mg turnings (28.2 g, 1.16 mol) were added in 2 gm portions, over the course of an hour, to 750 ml of methanol. If this unstabilized solution is allowed to heat above 45° C. the Mg(Ome)$_2$ is liable to undergo spontaneous polymerization to an intractable solid. The warm solution was filtered through a medium porosity glass frit and diluted to 900 ml.

Preparation of MgBr$_2$/Si(OMe)$_4$ Solution

Silicon tetrabromide (52.4 g, 0.151 mol) was added dropwise to 234 ml (0.302 mol) of the above Mg(OMe)$_2$ solution followed by 50 ml of methanol, thereby generating the stabilizing Si(OR)$_4$ species in situ.

Preparation of Mg$_4$(OMe)$_6$(MeOH)$_{10}$Br$_2$

A 50° C. solution of this MgBr$_2$/Si(OMe)$_4$ (100 mmol Mg) was added rapidly to a stirred 50° C. solution of Mg(OMe)$_2$ (258 mmol Mg) prepared above. After stirring 45 minutes, the crystalline precipitate was collected by filtration, washed once with an isooctane/isopropanol (4:1) solution, twice with isooctane and then dried under moving nitrogen. The yield was 57.0 gm (84%) of crystals of the shape shown in FIG. 4 with average particle size of 20 microns. Upon boiling in isooctane for 1 hour, a 20 gm sample decreased in weight to 17 gm, indicating a loss of 44.5% of the bound methanol.

Example 66

A solution of commercially available 8% Mg(OMe)$_2$ in methanol (270 gm, 0.25 mol) was heated to 47° C. whereupon silicon tetrabromide (33 mmol) was added dropwise over about 5 minutes. After stirring 15 minutes, the crystalline precipitate was collected by filtration, washed 3 times with isooctane and dried under moving nitrogen. The yield was 25.2 gm (52.8%) of crystals in the size range of 30–80 microns with shapes consisting of a mixture of the dodecahedra of FIG. 3 and 4.

Example 67

Preparation of Stabilized Mg(OMe)$_2$ Solution

Tetramethoxysilane or tetraethoxysilane (7.73 gm, 50.8 mmol; 10.6 gm, 50.8 mmol) is dissolved in 270 ml MeOH and then magnesium (9.4 gm, 387 mmol) is added in 1 gm portions, as hydrogen evolution subsides, over a one hour period. The solution is filtered through a medium porosity glass frit and diluted with MeOH to 270 ml (if necessary).

Preparation of MgBr$_2$ Solution

Bromine (20.6 g, 258 mmol) is dissolved in 150 ml of ice cooled methanol Magnesium (3.13 g, 129 mmol) is added in 0.5 g portions over 2 hours, with rapid stirring. Tetramethoxysilane (2.58 gm, 17 mmol) was added to the solution.

Preparation of Mg$_4$(OMe)$_6$(MeOH)$_{10}$Br$_2$

The MgBr$_2$ solution (above) was heated to 62° C. and added rapidly to a stirred solution of Mg(OMe)$_2$ (above), also at 62° C. After stirring at 55–64° C. for 1 hour, the solid was collected by filtration, washed twice with isooctane/isopropanol (3/1) solution, twice with isooctane and then dried under moving nitrogen. The yield was 73.3 gm (75.2%) of crystals of the shape of FIG. 4. Analysis: 12.94% Mg, 63.7% MeOH.

Example 68

Preparation of MgBr$_2$ Solution

As in Example 67 using 19.0 gm Br$_2$ in 134 ml methanol plus 2.89 gm Mg.

Preparation of Stabilized Mg(OMe)$_2$ Solution

As in Example 67 using 11.8 gm phenyltrimethoxysilane dissolved in 270 ml methanol plus 8.68 gm Mg.

Preparation of $Mg_4(OMe)_6(MeOH)_{10} Br_2$

As in Example 67 via rapid mixing of the above two solutions at 60° C. Yield: 70.7 gm (78.6%). Analysis: 12.83% Mg, 67.02% methanol and 20.46% bromine.

Example 69

Preparation of $Mg Br_2$ Solution

As in Example 67 using 19.0 gm $Br_2$ in 134 ml methanol plus 2.89 gm Mg.

Preparation of Stabilized $Mg(OMe)_2$ Solution

As in Example 67 using 7.38 gm trimethoxyphosphite $(P(OME)_3)$ dissolved in 270 ml methanol plus 8.68 gm magnesium.

Preparation of $Mg_4(OMe)_6(MeOH)_{10} Br_2$

As in Example 67 via rapid mixing of the above two solutions at 58° C. yield 68.1 gm (75.7%).

Example 70

Preparation of $Mg_4(OEt)_6(MeOH)_3Br_2$ 2.0 gm of $Mg_4(OMe)_6Br_2$ (Example 67) was slurried in 200 gm of tetraethoxysilane in a sealed bottle and gently rolled in an oil bath. After 17.5 hours at 35° C. the slurry had become milky. The temperature was then held at 50° C. for 27 hours, at 75° C. for 2.3 hours, at 105° C. for 14 hours (whereupon the milkiness had disappeared and definitely crystalline product was being produced) and then finally at 125° C. for 8 hours. The mixture was cooled to room temperature and the solids were collected on a coarse fritted glass funnel, washed twice with isooctane and dried under moving nitrogen. The yield was 16.3 g of 12–50 micron clusters of nearly cubic parallelipipeds. Analysis: 23.2% Br, 15.75% Mg, 46.6% EtOH, an 15.2% MeOH.

Example 71

A catalyst was prepared from the $Mg_4(OEt)_6(MeOH)_3 Br_2$ of Example 70 according to the procatalyst preparation procedure of Illustrative Embodiment I with the exception that 0.35 ml of p-toluoyl chloride was used instead of phthaloyl chloride. 1.74 ml of isobutylpthalate was added as the electron donor and the catalyst contained 2.71% titanium.

This catalyst was used to polymerize propylene according to the LIPP polymerization procedure set forth in Illustrative Embodiment I. 0.56 mmol of triethyl aluminum, 0.105 mmol of diphenyldimethoxy silane and 5.7 micromols of titanium were used. The productivity of the catalyst was determined to be 39.5 kg of polypropylene per gm of catalyst and the polymer contained 4.1% xylene solubles. The bulk density of the polymer was 0.295 and its shape was cubes and agglomerates of cubes.

ILLUSTRATIVE EMBODIMENT IV

Example 72

To 111 gm of 12% $Mg(OMe)_2$ solution (stabilized and containing 154 mmol Mg, 19 mmol $Si(OR)_4$) stirred at room temperature as added dropwise a solution of 8.6 gm resorcinol (78.1 mmol) in 9.0 gm of methanol. After 37% of the resorcinol had been added, precipitation began. The $Mg(OMe)_2$ solution was then heated to 60° C. and the rest of the resorcinol solution was added. After stirring one hour at 60° C., the solution was allowed to cool. The solids were collected by filtration, washed with isopropanol/isooctane solution (1:3, wt:wt), then isooctane and then dried under moving nitrogen to yield 30.4 gm (96.3%) of crystalline material. Under microscopic examination the crystal shape appeared as in FIG. 7.

Example 73

100 gm of 12% $Mg(OMe)_2$ solution (stabilized and containing 139 mmol Mg) was heated to 60° C. Then a mixture of 3.74 gm resorcinol (34 mmol) and 6.28 gm methacrylic acid (77.6 mmol) in 10 ml of methanol was added dropwise to give a crystalline precipitate. After filtering and i-$C_8$ wash and $N_2$ drying, 16.0 gm of very dense crystals were obtained in the shape of short square cylinders as in FIG. 5 (under microscope).

Example 74

To 100 gm of 12% $Mg(OMe)_2$ solution (stabilized and containing 139 mmol Mg and 17 mmol $(Si(OR)_4)$) at 60° C. was added 7.31 gm of 2,4-pentanedione (73 mmol) to obtain a clear solution. To this was added 3.74 gm of resorcinol (34 mmol) as a 53% solution in methanol. After stirring at 60° C. for less than 1 hour, a voluminous precipitate appeared. Filtration, i-$C_8$ wash and $N_2$ drying yielded 17.9 gm of fluffy crystalline powder. Tiny crystalline flakes were seen in a microscope (FIG. 9).

Example 75

Preparation of Catalyst from the Resorcinolate Species: $(Mg(OCH_3)_6 (CH_3OH)_{10} (C_6H_4OHO)$ Prepared in Example 72

40 g was placed in 300 gm of cyclohexane with 120 g of tetraethoxysilane (TEOS). This mixture was placed in a 110° C. oil bath and allowed to boil about 1.5 hours (to lose about 20% of the total volume). After filtration and drying, 32.1 g of solid material was obtained.

7.8 gm of this material (containing 49 mmol of Mg) was then subjected to a standard 115° C. catalyst preparation where 2.5 ml of isobutylphthalate was used in a digest of 200 ml of 50/50 $TiCl_4/CB$ and 0.5 ml phthaloyl chloride plus 0.5 ml phthaloyl chloride plus 0.5 ml of p-toluoyl chloride were used in 200 ml of 50/50 $TiCl_4/CB$ as a first wash. 200 ml of 50/50 $TiCl_4/CB$ were used as a second wash. A 10 minute wash of 100 ml of 50/50 $TiCl_4/CB$ @115° C. was then applied followed by 6 150 ml isopentane washes and $N_2$ drying @40° C. The yield was 6.5 gm of dark brown powder. Analysis: Ti=3.23%, Mg=19.6%, Cl=63.1%.

Examples 76–78

The catalyst made in Example 75 was used to polymerize propylene by the LIPP procedure set forth in Illustrative Embodiment I. In two of the examples, a different selectivity control agent, tetramethylpiperidine (TMP), was used in place of the diphenyldimethoxy silane (DPDMS). The results of the polymerizations are shown in Table 5.

TABLE 5

| Example No. | Titanium (mmol) | TEA (mmol) | SCA (mmmol) | SCA (type) | Productivity (kg polypropylene/gm catalyst/hr) | Xylene Solubles (% wt) |
|---|---|---|---|---|---|---|
| 76 | 0.006 | 0.42 | 0.048 | TMP | 71.8 | 8.3 |
| 77 | 0.0045 | 0.32 | 0.014 | DPDMS | 50.0 | 5.0 |
| 78 | 0.0045 | 0.32 | 0.048 0.014 | TMP + DPDMS | 58.0 | 4.6 |

With TMP as the selectivity control agent, a high yield is obtained but the xylene solubles are also high. With DPDMS, a lower yield is obtained but the xylene solubles are low. When the two selectivity control agents were mixed together, an intermediate yield is obtained but the xylene solubles are lower still.

ILLUSTRATIVE EMBODIMENT V 106 gm of 8% Mg(OMe)$_2$ solution (97 mmol Mg, 12 mmol Si(OR)$_4$) was stirred at 60° C. To this solution was added dropwise a solution of 51 mmol of the appropriate acid in 10 ml of methanol. After precipitation, the solids were collected by filtration, washed twice with isooctane and then dried under moving nitrogen. Yields and crystal shapes are shown in Table 6. The acetate salt is prepared in the same manner but must be ice-cooled to give a precipitate of crystals in the shape of FIG. 8.

TABLE 6

| Example | Acid Used | Product Molecular Weight | Yield (gm) | Yield (%) | Shape |
|---|---|---|---|---|---|
| 79 | Chloroacetic | 198.2 | 10.9 | 56.5 | FIG. 12 |
| 80 | Methacrylic | 194.0 | 13.4 | 71.0 | FIG. 5 |
| 81 | Methacrylic (via 12% Mg(OMe)$_2$) | 194.0 | 27.1 | 90.6 | FIG. 5 & 6 |
| 82 | Acrylic | 186.98 | 8.3 | 45.6 | FIG. 8 |
| 83 | Propionic | 187.99 | 8.2 | 44.8 | FIG. 10 |
| 84 | Butyric | 195.0 | 8.4 | 44.3 | FIG. 6 |
| 85 | Benzoic | 212.01 | 12.9 | 62.6 | FIG. 11 |

ILLUSTRATIVE EMBODIMENT VI

In Situ Generation of Phosphorous Esters as Stabilizing Agents

Example 86

In like manner to Example 69, 9:4 gm of Mg was dissolved in methanol to prepare a solution volume of 310 ml. Phosphorous trichloride (9.3 gm, 68 mmol) was added dropwise to 64 ml of that solution, then the remainder of the magnesium methoxide solution (246 ml) was added rapidly at 50° C. Cooling to room temperature yielded a crop of large, well formed crystals.

Example 87

The above experiment was repeated using 18.4 g of phosphorous tribromide instead of PCl$_3$ to yield 29.4 g of well formed crystals with average particle size of 19.5 microns.

ILLUSTRATIVE EMBODIMENT VII

Demonstration of Thermal Instability of Mg(OMe)$_2$ Solutions

Example 88

A 250 g sample of commercially available 8% Mg(OM3)$_2$ in methanol turned quite cloudy upon heating to 50° C. It was then heated to boiling and ⅓ of the solvent was boiled away. After cooling, the solvent was replaced but the white precipitate did not redissolve. The precipitate was collected on a fritted filter, washed with isooctane and dried under moving nitrogen (weight 5.0 gm). Assuming the product to be Mg(OMe)$_2$ . 2MeOH polymer (m.w. 150.44), that implies that more than 14% of the Mg(OMe)$_2$ had decomposed to that intractable polymer. On the other hand, the Si(OR)$_4$ stabilized 12-15% solutions described herein may be refluxed nearly indefinitely with practically no observable signs of decomposition.

I claim:

1. A process for preparing an alkoxymagnesium compound which is stabilized to avoid decomposition to undesirable polymeric materials which comprises contacting the alkoxymagnesium compound with a buffer compound.

2. The process of claim 1 wherein the buffer compound is Si(OR")$_4$ or P(OR")$_3$ where R" is selected from alkyl groups of 1 to 4 carbon atoms.

3. The process of claim 2 wherein R" is CH$_3$.

4. The process of claim 1 wherein the buffer compound is provided by adding to the alkoxy magnesium compound a material selected from the group consisting of silicon tetrachloride, silicon tetrabromide, tetramethoxy silane, tetraethoxy silane, phenyltrimethoxy silane, oxalic acid, acetic acid, formic acid, trimethoxyphosphine, trichlorophosphine and triboromophosphine.

5. The process of claim 1 wherein the alkoxymagnesium compound is subjected to a further stabilizing treatment by contacting said alkoxymagnesium compound with hydrogen chloride.

6. The process of claim 1 wherein the alkoxy magnesium compound is subjected to a further stabilizing treatment by boiling said alkoxy magnesium compound in a boiling inert hydrocarbon.

7. A process for preparing a stable magnesium compound of the formula [Mg$_4$(OR)$_6$(R'OH)$_{10}$]X where X is a counter ion having a total charge of −2 and R and R', which may be the same or different, are selected from alkyl groups of 1 to 4 carbon atoms, which process comprises contacting Mg(OR)$_2$, MgX and R'OH in solution in the presence of a buffer compound.

8. The process of claim 7 wherein the buffer compound is Si(OR")$_4$ or P(OR")$_3$ where R" is selected from alkyl groups of 1 to 4 carbon atoms.

9. The process of claim 8 where R, R' and R" are all CH$_3$.

10. The process of claim 7 wherein the buffer compound is provided by adding to the alkoxy magnesium compound a material selected from the group consisting of silicon tetrachloride, silicon tetrabromide, tetramethoxy silane, tetraethoxy silane, phenyltrimethoxy silane, oxalic acid, acetic acid, formic acid, trimethoxyphosphine, trichlorophosphine and tribromophosphine.

11. The process of claim 7 wherein the stable magnesium compound is subjected to a further stabilizing treatment by contacting said alkoxymagnesium compound with hydrogen chloride.

12. The process of claim 7 wherein the stable magnesium compound is subjected to a further stabilizing treatment by boiling said alkoxy magnesium compound in a boiling inert hydrocarbon.

13. A process for preparing a stable magnesium compound of the formula Mg(OR)$_2$ . nR'OH where R and R' which may be the same or different, are selected from alkyl groups of 1 to 4 carbon atoms, which comprises contacting the stable magnesium compound with a buffer compound.

14. The process of claim 13 wherein the buffer compound is Si(OR")$_4$ or P(OR")$_3$ where R" is selected from alkyl groups of 1 to 4 carbon atoms.

15. The process of claim 14 where R, R' and R" are all CH$_3$.

16. The process of claim 13 wherein the buffer compound is provided by adding to the stable magnesium compound a material selected from the group consisting of silicon tetrachloride, silicon tetrabromide, tetramethoxy silane, tetraethoxy silane, phenyltrimethoxy silane, oxalic acid, acetic acid, formic acid, trimethoxyphosphine, trichlorophosphine and tribromophospine.

17. The process of claim 13 wherein the stable magnesium compound is subjected to a further stabilizing treatment by contacting said alkoxymagnesium compound with hydrogen chloride.

18. The process of claim 13 wherein the stable magnesium compound is subjected to a further stabilizing treatment by boiling said alkoxy magnesium compound in a boiling inert hydrocarbon.

* * * * *